United States Patent
Takeuchi

(10) Patent No.: US 11,822,830 B2
(45) Date of Patent: Nov. 21, 2023

(54) IMAGE PRINT DEVICE AND ORDER RECEIVING TERMINAL

(71) Applicant: Dai Nippon Printing Co., Ltd., Tokyo (JP)

(72) Inventor: Ayaka Takeuchi, Tokyo (JP)

(73) Assignee: Dai Nippon Printing Co., Ltd., Tokyo (JP)

(*) Notice: Subject to any disclaimer, the term of this patent is extended or adjusted under 35 U.S.C. 154(b) by 0 days.

(21) Appl. No.: 17/753,331

(22) PCT Filed: Sep. 3, 2020

(86) PCT No.: PCT/JP2020/033413
§ 371 (c)(1),
(2) Date: Feb. 28, 2022

(87) PCT Pub. No.: WO2021/045146
PCT Pub. Date: Mar. 11, 2021

(65) Prior Publication Data
US 2022/0308801 A1    Sep. 29, 2022

(30) Foreign Application Priority Data

Sep. 3, 2019 (JP) ................. 2019-160491
Jul. 31, 2020 (JP) ................. 2020-130612

(51) Int. Cl.
*G06F 3/12* (2006.01)
(52) U.S. Cl.
CPC .......... *G06F 3/1203* (2013.01); *G06F 3/1238* (2013.01); *G06F 3/1256* (2013.01)
(58) Field of Classification Search
CPC .... G06F 3/1203; G06F 3/1238; G06F 3/1256; G06F 3/1208; G06F 3/1242; B41J 21/00; G07F 17/26; H04N 1/387
(Continued)

(56) References Cited

U.S. PATENT DOCUMENTS

2003/0098994 A1   5/2003  Tacke
2004/0183880 A1*  9/2004  Kito .................. B41J 11/009
                                                            399/45
(Continued)

FOREIGN PATENT DOCUMENTS

CN    204774095 U    11/2015
JP    2004-042481 A   2/2004
(Continued)

OTHER PUBLICATIONS

International Search Report and Written Opinion (Application No. PCT/JP2020/033413) dated Nov. 24, 2020 (with English translation).

*Primary Examiner* — Darryl V Dottin
(74) *Attorney, Agent, or Firm* — BURR PATENT LAW, PLLC

(57) ABSTRACT

The present invention enables a desired number of original gift boxes to be produced easily. An image print device includes an input unit to which a user image is input, a storage unit storing a template image of a gift box, an edit processing unit combining the template image with the user image to generate a combined image, and a printer printing, for output, the combined image on a sheet. The storage unit stores a plurality of template images of gift boxes different in shape or size. The image print device further includes a box selection unit receiving selection of a gift box shape or size, and the edit processing unit combines a template image with the user image, the template image corresponding to the gift box shape or size that is selected.

4 Claims, 10 Drawing Sheets

(58) Field of Classification Search
USPC .......................................................... 358/1.15
See application file for complete search history.

(56) References Cited

U.S. PATENT DOCUMENTS

2014/0055796 A1* 2/2014 Hannaway ............. H04N 1/387
            358/1.3
2014/0055820 A1* 2/2014 Hannaway ............. G06F 3/1206
            358/3.28

FOREIGN PATENT DOCUMENTS

| JP | 2004-178356 A | 6/2004 |
| JP | 2006-005840 A | 1/2006 |
| JP | 6442924 B2 | 12/2018 |

* cited by examiner ated easily.

IMAGE PRINT DEVICE AND ORDER RECEIVING TERMINAL

TECHNICAL FIELD

The present invention relates to an image print device and an order receiving terminal.

BACKGROUND ART

When items are to be given, for example, to friends as presents, the items are often stored in gift boxes and are presented. Such a gift box may be a commercial gift box, and may be an original gift box. An original gift box is produced by a user themselves making a drawing on a sheet, or is produced by ordering from a printing business.

When a user themselves makes a drawing to produce a gift box, as many boxes as necessary may be produced, but it takes time and effort. When a user orders from a printing business, the cost is high and the minimum lot contains more than needed, resulting in wasteful cost.

PTL 1: JP2006-5840A
PTL 2: JP6442924B2

SUMMARY OF INVENTION

The present invention aims to provide an image print device and an order receiving terminal which enable a desired number of original gift boxes to be produced easily.

According to one aspect of the present invention, an image print device includes an input unit to which a user image is input, a storage unit storing a template image of a gift box, an edit processing unit combining the template image with the user image to generate a combined image, and a printer printing, for output, the combined image on a sheet.

According to one aspect of the present invention, an order receiving terminal includes an input unit to which a user image is input, a storage unit storing a template image of a gift box, an edit processing unit combining the template image with the user image to generate a combined image, and a communication unit transmitting the combined image and a print order to an outside.

Advantageous Effects of Invention

The present invention enables a desired number of original gift boxes to be produced easily.

DESCRIPTION OF EMBODIMENTS

An embodiment of the present invention will be described below on the basis of the drawings.

Figure 1:
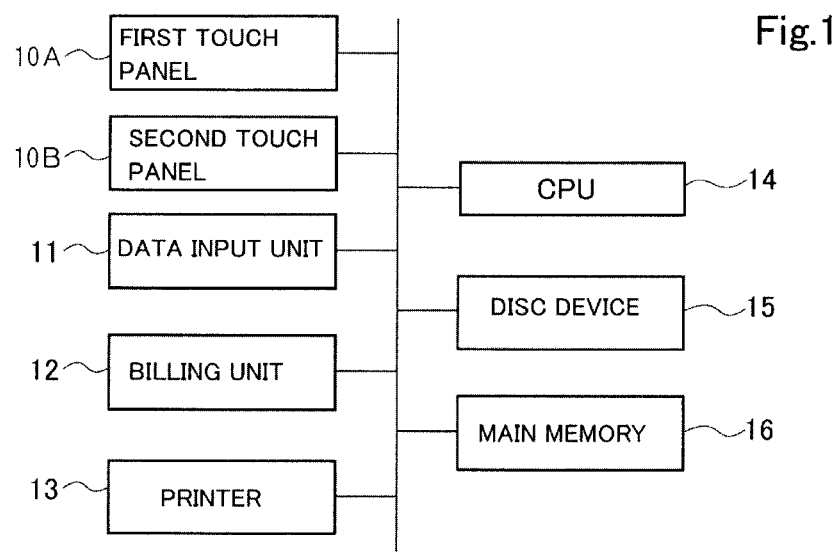
FIG. 1 is a block diagram illustrating the hardware of an image print device according to an embodiment of the present invention.
Figure 2:
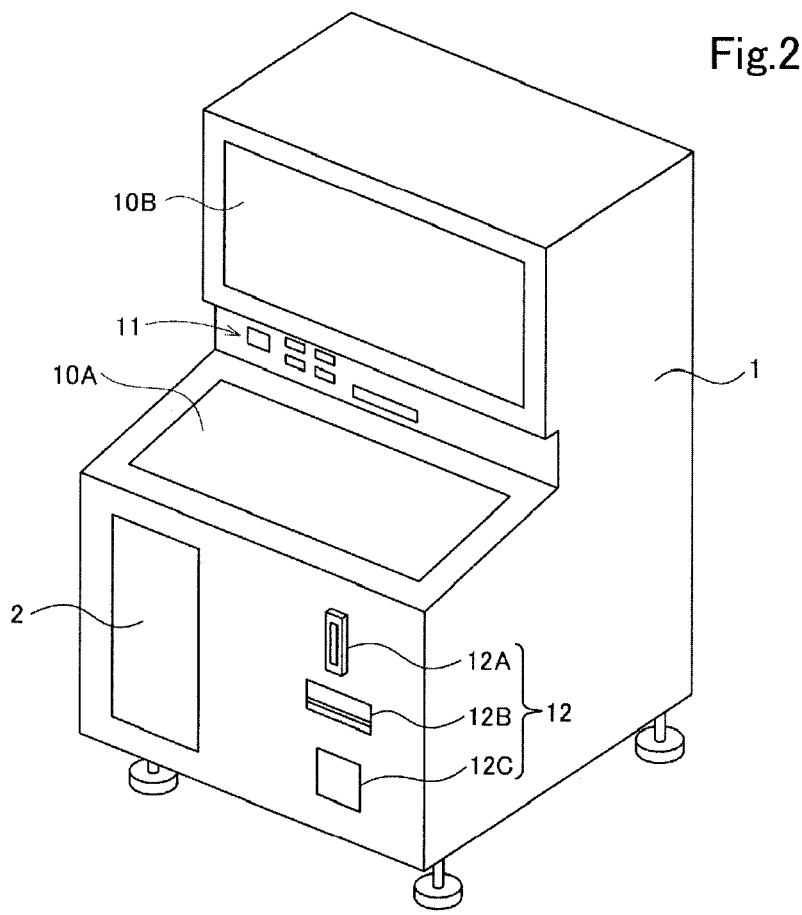
FIG. 2 is a perspective view of the image print device.

FIG. 1 is a block diagram illustrating a hardware configuration of an image print device according to the present embodiment. FIG. 2 is a perspective view of the image print device. In printing, for output, a gift box template image (expansion plan image) on a sheet, the image print device enables an original gift box to be produced by combining the template image with an image that is input by a user.

As illustrated in FIGS. 1 and 2, the image print device includes a first touch panel 10A, a second touch panel 10B, a data input unit 11, a billing unit 12, a printer 13, a central processing unit (CPU) 14, a disc device (storage unit) 15, and a main memory 16.

As illustrated in FIG. 2, the first touch panel 10A and the second touch panel 10B are disposed above and below each other. The first touch panel 10A is slightly inclined so that the near side is lower and the far side is higher to make input operations easy to be performed. The second touch panel 10B stands almost vertically.

The first touch panel 10A and the second touch panel 10B display information including images, and receive, from users, input of various instructions. For example, the first touch panel 10A displays the following screens: a screen for selecting a way to input image data to the image print device (for example, use of a storage medium, infrared communication from a portable terminal, or wireless communication from a smartphone); a screen of displaying cautions; a screen for selecting an image to be combined with a gift box template image; an order screen for receiving, for example, specification of the number of print sheets; basic operation screens such as screens for confirming an order and the amount billed; and an edit screen described below.

The data input unit 11 reads image data (user image) from a storage medium storing image data photographed by a digital camera or the like, and thus receives input of the image data. The data input unit 11 has a data reading device compatible with various storage media. The data input unit 11 may receive input of image data from a portable terminal through wired communication or wireless communication.

The billing unit 12, which has a coin slot 12A, a bill slot 12B, and a change return opening 12C disposed on the front surface of a housing 1, specifies, for counting, cash dropped from the coin slot 12A and the bill slot 12B, and ejects change from the change return opening 12C. The billing unit 12 may have a function for payment by electronic cash. The billing unit 12 may have a receipt printer which prints, for output on a receipt, the number of print sheets, a per-unit price, the amount billed, the amount of input cash, the amount of change, and the like.

The printer 13, which is, for example, a dye-sublimation or inkjet high-resolution color printer, prints out images. The printer 13 is housed in the housing 1. As illustrated in FIG. 2, a transparent openable door 2 is disposed on the front surface of the housing 1 so as to be openable/closable. On the backside of the openable door 2, an accumulation unit (not illustrated), on which printed matter printed out by the printer 13 is accumulated, is disposed. The openable door 2 is opened, and printed matter, which is accumulated on the accumulation unit, may be removed. Multiple printers 13 may be housed in the housing 1 in accordance with the types of sheets used.

The disc device 15 stores a gift-box production program, a control program, gift-box design data, template image data, and edit item data such as stamps. The disc device 15 is, for example, a hard disk drive.

The CPU 14 loads the control program in the disc device 15 to the main memory 16, and executes the control program. Thus, the CPU 14 functions as a controller which controls the first touch panel 10A, the second touch panel 10B, the billing unit 12, and the printer 13.

Figure 3:
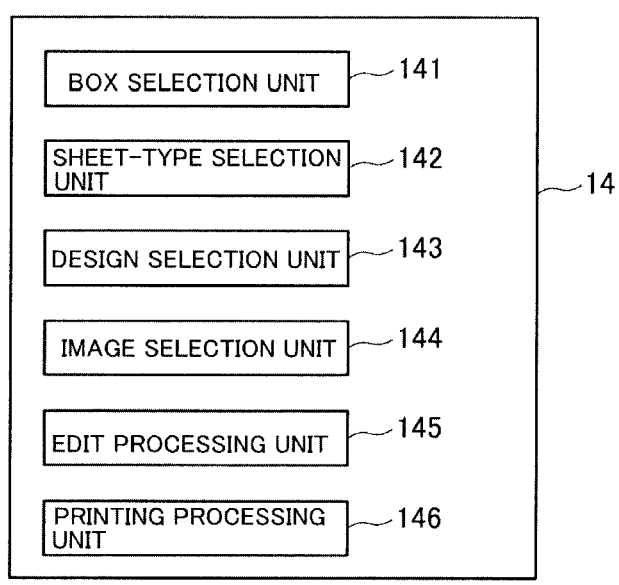
FIG. 3 is a functional block diagram of the image print device.

The CPU 14 loads the gift-box production program in the disc device 15 to the main memory 16, and executes the gift-box production program. In execution of the gift-box production program, as illustrated in FIG. 3, the functions of a box selection unit 141, a sheet-type selection unit 142, a design selection unit 143, an image selection unit 144, an edit processing unit 145, and a printing processing unit 146 are implemented. The processes of the units will be described below.

Figure 4:
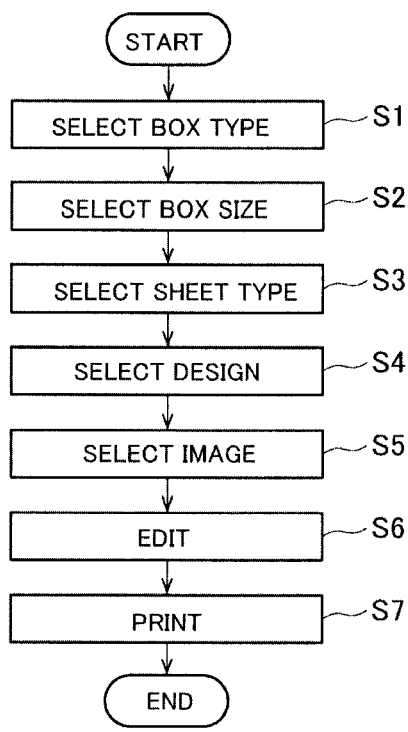
FIG. 4 is a flowchart for describing an image print method.

The image print method using the image print device will be described by referring to the flowchart in FIG. 4.

Figure 5:
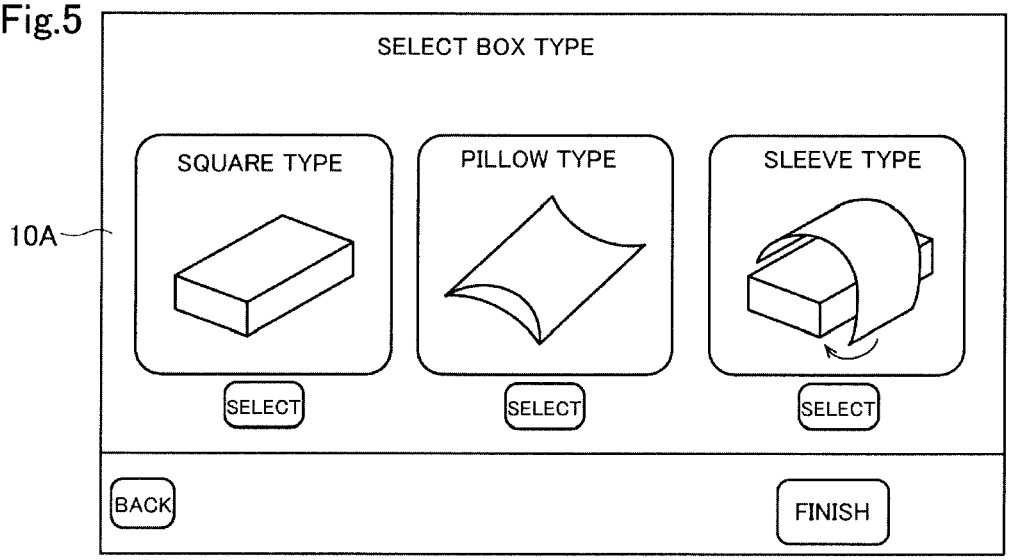
FIG. 5 is a diagram illustrating an exemplary box-type selection screen.

When a user operates the touch panel 10A to select the gift-box production mode, the box selection unit 141 displays, on the touch panel 10A, a box-type selection screen for selecting the type of a gift box to be produced, as illustrated in FIG. 5. The "sleeve type" illustrated in FIG. 5 indicates a belt-like sheet wrapped around a box. The user selects the type of a gift box to be produced (step S1). The box selection unit 141 receives selection of a box type from the user.

Figure 6:
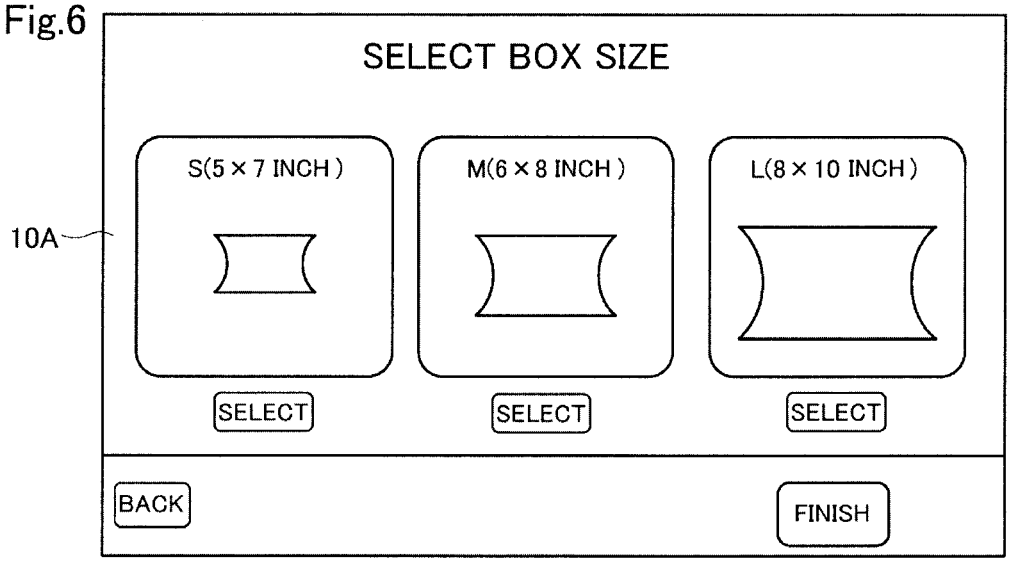
FIG. 6 is a diagram illustrating an exemplary box-size selection screen.

The box selection unit 141 displays, on the touch panel 10A, a box-size selection screen for selecting the size of the gift box to be produced, as illustrated in FIG. 6. The user selects the size of the gift box to be produced (step S2). The box selection unit 141 receives selection of a box size from the user.

The sheet-type selection unit 142 displays, on the touch panel 10A, a sheet-type selection screen for selecting a sheet type which is to be used as the material for the gift box. For example, a sheet to be used is selected, for example, from a standard sheet and glossy sheets, such as a pearl sheet and a metallic sheet. The user selects the sheet type to be used (step S3). The sheet-type selection unit 142 receives selection of a sheet type from the user. When only one sheet type is prepared, this step is skipped.

The design selection unit 143 displays, on the touch panel 10A, a design selection screen for selecting a design of the gift box. Various pieces of design data of different colors and patterns are prepared in advance, and the design selection unit 143 uses the design data to display multiple design candidates on the design selection screen. The user selects a desirable design (step S4). The design selection unit 143 receives selection of a design from the user.

The image selection unit 144 receives, from the user, selection of a user image to be printed on the gift box (step S5). For example, when the data input unit 11 receives input of image data from the user, the image selection unit 144 displays, on the first touch panel 10A, a screen of the input image list. The user selects, from the image list, a user image to be printed on the gift box.

When the user inputs only one image, the input image may be automatically selected as an image to be printed on the gift box.

Figure 7:
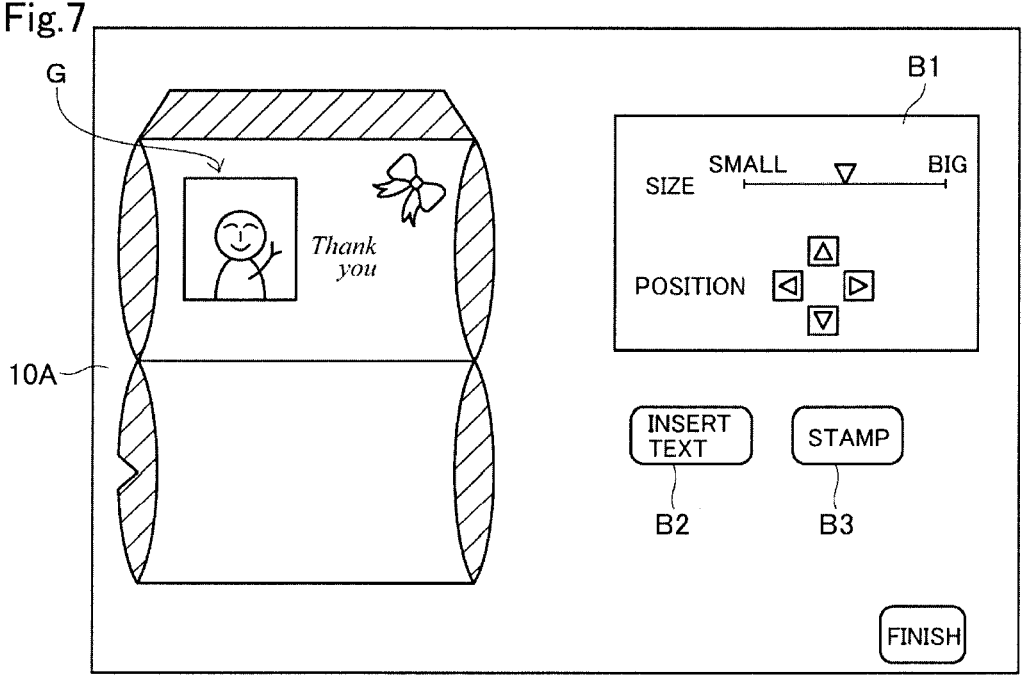
FIG. 7 is a diagram illustrating an exemplary edit screen.

The edit processing unit 145 combines a gift box template image, which corresponds to the box type and the box size which are selected in steps S1 and S2, with the design, which is selected in step S4, and the user image, which is selected in step S5, and generates a combined image. The edit processing unit 145 displays, on the touch panel 10A, an edit screen including a preview of the combined image, as illustrated in FIG. 7. The user may operate the touch panel 10A for editing (step S6).

For example, a button B1 may be used to adjust the size and the position of a user image G. Pressing a button B2 causes insertion of a text box. Pressing a button B3 causes a stamp list to be displayed for insertion of a selected stamp onto the gift box template image. In addition, an edit process such as trimming may be performed on a user image that is to be combined.

Figure 8:
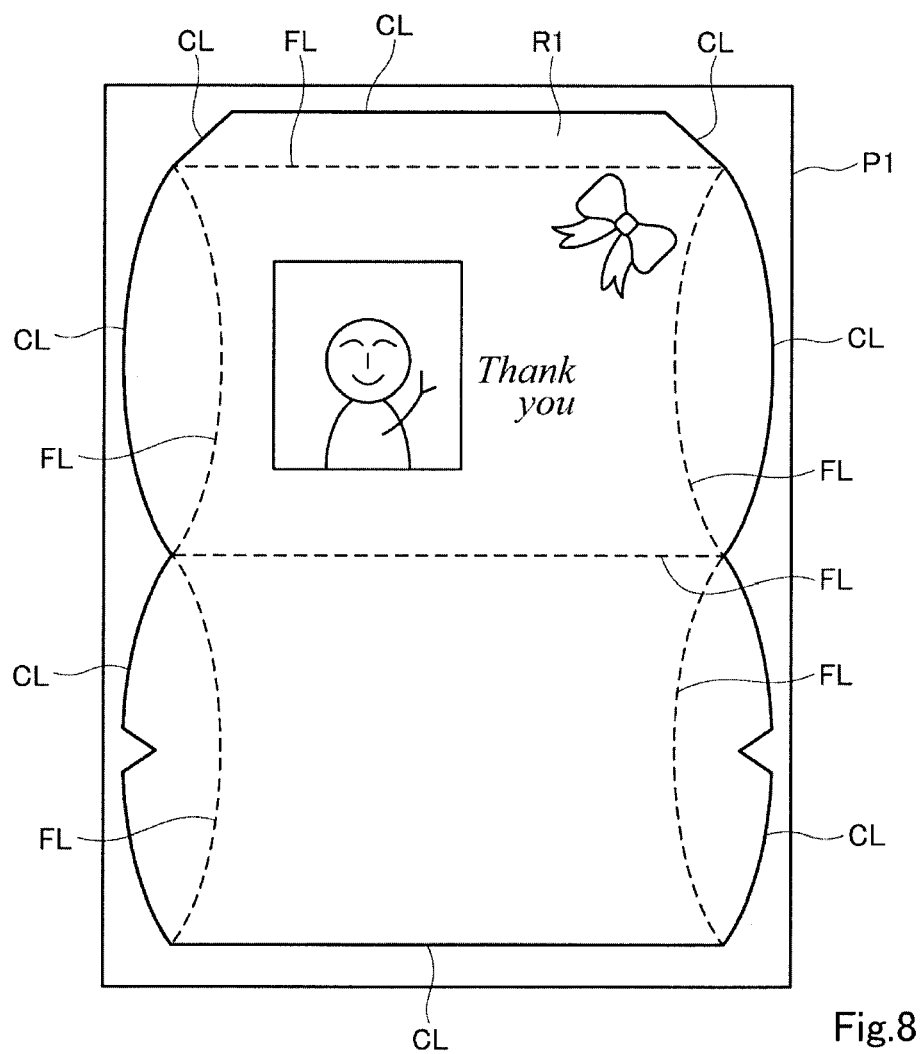
FIG. 8 is a diagram illustrating exemplary printed matter.
Figure 9:
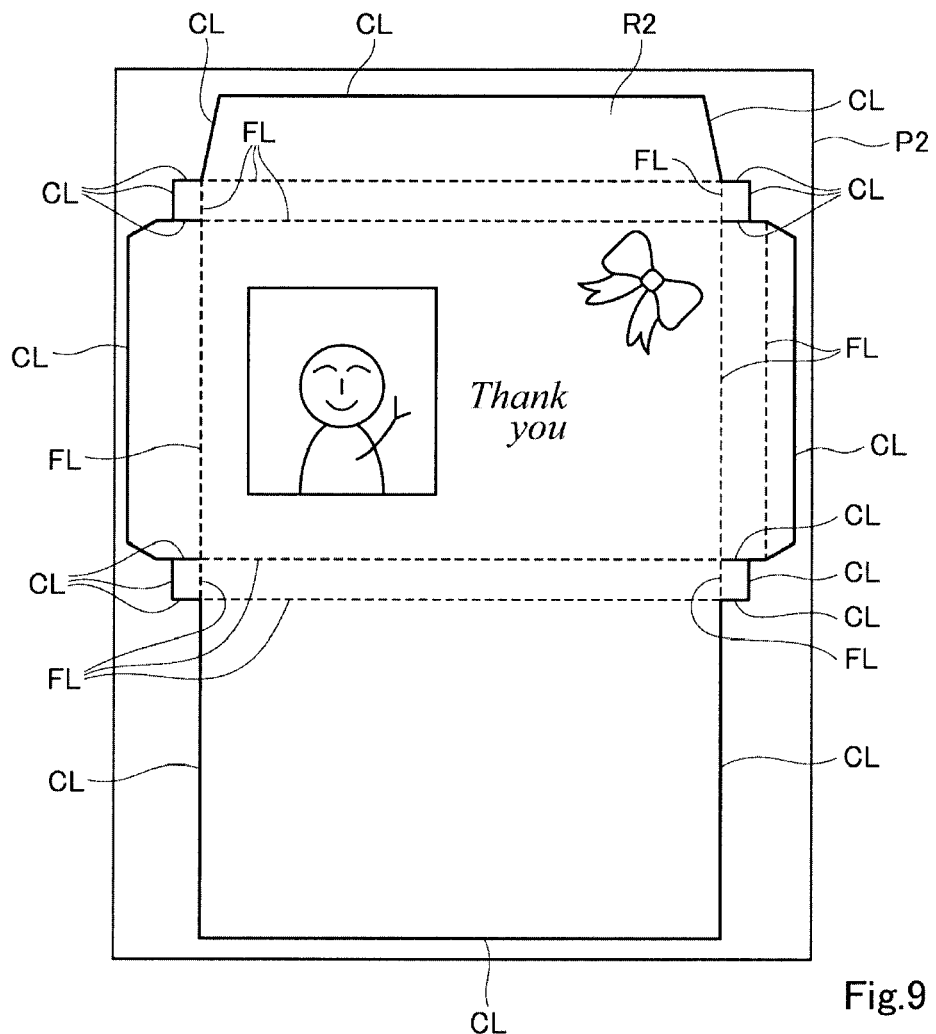
FIG. 9 is a diagram illustrating exemplary printed matter.

When an edit process is completed and a payment process using the billing unit 12 is performed, the printing processing unit 146 transfers, to the printer 13, the gift box template image data with which the user image has been combined, and causes the printer 13 to perform a print process (step S7). The number of print sheets is specified in the payment process. The printer 13 outputs pieces of printed matter whose number is equal to the specified number. When the sheet type has been selected in step S3, the printer 13 prints the gift box template image on a sheet of the selected type. The printer 13 outputs printed matter P1 and printed matter P2 as illustrated in FIGS. 8 and 9.

The printed matter P1 is obtained by printing a template image of the pillow-type gift box. The printed matter P2 is obtained by printing a template image of the square type (rectangular-shaped) gift box. As illustrated in FIGS. 8 and 9, cutoff lines (cutout lines) CL are printed by using solid lines, and folding lines FL are printed by using dotted lines (dashed lines). The printed matter P1 and the printed matter P2 are exemplary gift box template images to be printed out. The image print device has template image data of gift boxes having various shapes other than the pillow type and the square type. A user is allowed to select their desirable gift box from the various types of gift box.

The user uses scissors or the like to cut the printed matter P1 or the printed matter P2 along the cutoff lines (cutout lines) CL illustrated by using solid lines. Glue or an adhesive is applied to tabs R1 and R2 for gluing, and the printed matter P1 or the printed matter P2 is folded along the folding lines FL. Thus, a gift box is assembled.

Thus, a desired number of original gift boxes, on which a user image is printed, may be produced.

Figure 10:
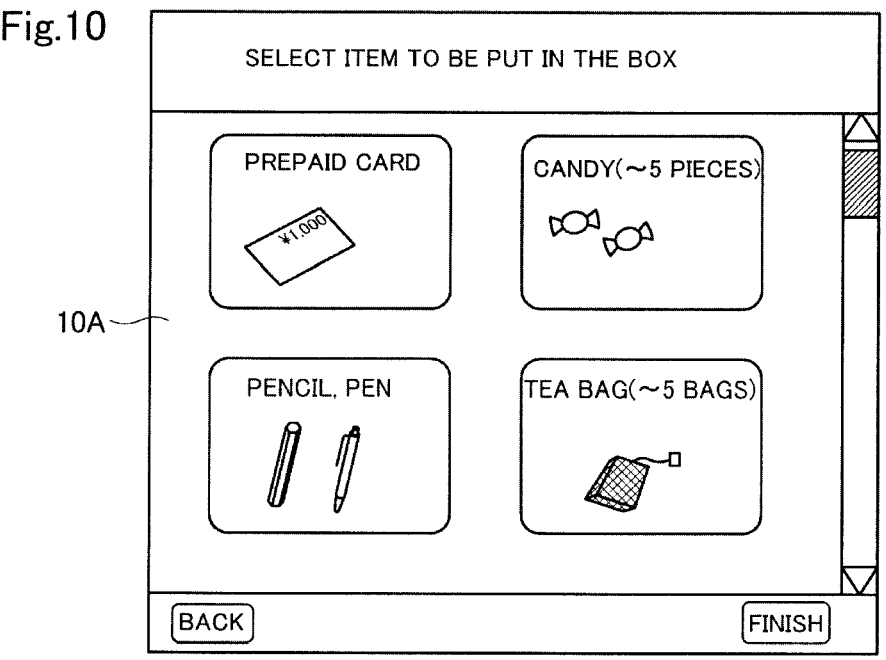
FIG. 10 is a diagram illustrating an exemplary stored-item selection screen.

In the embodiment described above, the example in which a user selects a box type (shape) and a box size is described. Alternatively, the device may automatically select a box type and a box size from an item which is to be put in a gift box. For example, a table, in which various items, which are often stored in gift boxes, are associated with box types and sizes preferable for the items, is prepared in advance. The box selection unit 141 displays, on the touch panel 10A, a stored-item selection screen as illustrated in FIG. 10. A user selects an item (an item to be presented, for example, to their friends) that is to be stored in a gift box. The box selection unit 141 refers to the table to select a box type and size corresponding to the item selected by the user. Thus, the user may produce original boxes compatible with the item to be presented.

Figure 11A:
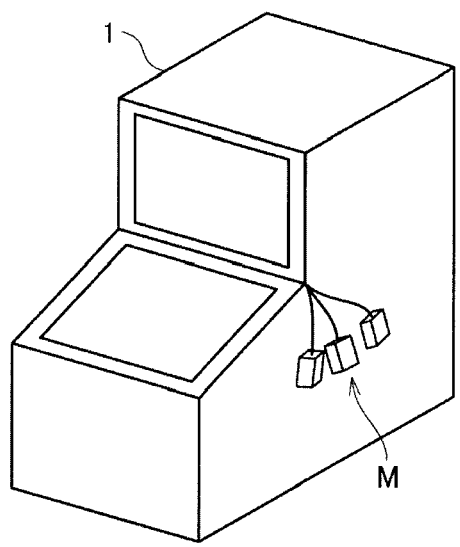
FIG. 11a is a perspective view of an image print device, to which samples are attached.
Figure 11B:
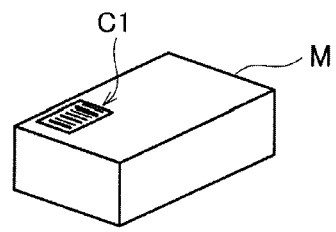
FIGS. 11b and 11c are perspective views of samples.
Figure 11C:
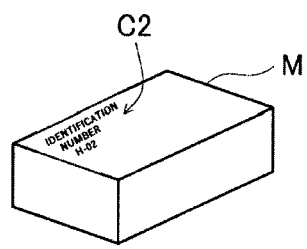

As illustrated in FIG. 11a, samples (models) M of gift boxes having various types (shapes) and sizes may be attached to the housing 1. As illustrated in FIGS. 11b and 11c, identification information indicating a type and size is provided for a sample M as code information C1 or an identification number C2. The code information C1 indicates a bar code or a two-dimensional code. The image print device stores, in advance, data in which types and sizes of gift boxes are associated with identification information.

A user compares the samples M with each other, and causes a reader, which is included in the image print device, to read the code information C1 printed on the sample M of a gift box that is to be produced, or inputs the identification number C2 to the touch panel 10A. The box selection unit 141 selects and determines the type and size of a gift box from the identification information, which is input through an identification information input unit, such as the reader or the touch panel 10A.

The printer 13 may print a gift box template image on seal paper. At that time, perforations may be formed so that the peeling sheets for the tabs for gluing are removed. Thus, without use of glue or an adhesive, a gift box may be assembled easily.

In the embodiment described above, the image print device which includes the printer 13 in the housing 1 and which outputs printed matter on site is described. Instead, an order receiving terminal which does not include the printer 13 and which receives a print order may be embodied. In this case, the order receiving terminal includes a communication unit which transmits, to a printer server over a wired or wireless network, an order and gift box template image data, with which a user image has been combined. A user receives the printed matter at a customer service window, or receives the printed matter by mail.

Figure 12:
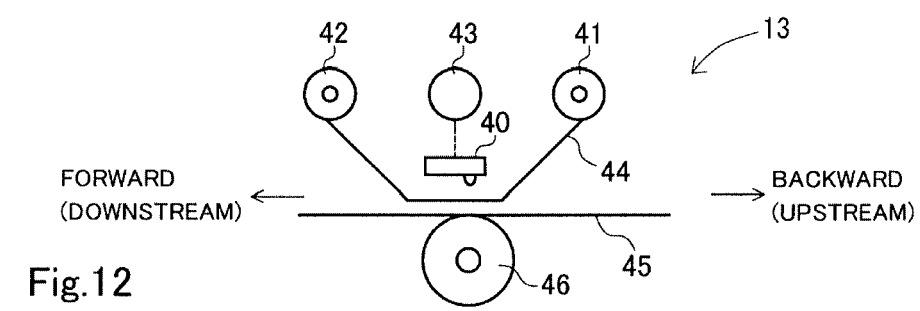
FIG. 12 is a schematic configuration view of a printer.
Figure 13:
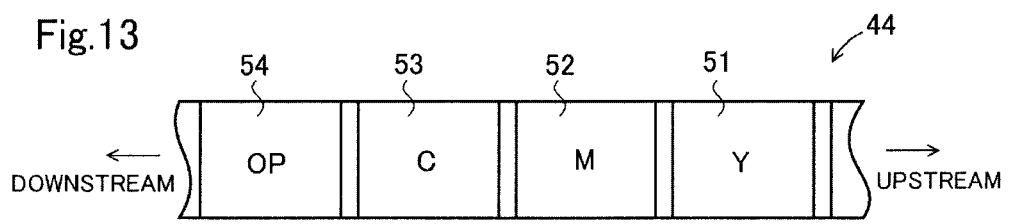
FIG. 13 is a plan view of a thermal transfer sheet used in the printer.

A dye-sublimation thermal transfer color printer is preferably used as the printer 13. FIG. 12 is a schematic configuration view of the dye-sublimation thermal transfer printer 13. FIG. 13 is a plan view of a thermal transfer sheet 44 (ink ribbon) used in the printer 13. The printer 13 includes a thermal head 40. The thermal head 40 heats the thermal transfer sheet 44 to form an image by causing dye to migrate onto photographic paper 45 (sheet) for a gift box. Then, the thermal head 40 transfers a protective layer on the image.

A supply unit 42, which is formed by wrapping the thermal transfer sheet 44, is disposed downstream of the thermal head 40. A recovery unit 41 is disposed upstream of the thermal head 40. The thermal transfer sheet 44, which is fed from the supply unit 42, passes the thermal head 40, and is recovered by the recovery unit 41.

A rotatable platen roller 46 is disposed below the thermal head 40. The thermal head 40 is coupled to a raising/lowering means 43 which is capable of raising/lowering the thermal head 40 from/toward the platen roller 46.

The thermal transfer sheet 44 has, on its single surface, a yellow dye layer 51, a magenta dye layer 52, a cyan dye layer 53, and a protective layer 54 which are sequentially and repeatedly disposed. The thermal transfer sheet 44 may have other color material layers such as fusible ink layers in addition to or instead of the dye layers. Alternatively, a thermal transfer sheet, having the yellow dye layer 51, the magenta dye layer 52, and the cyan dye layer 53, may be separate from a thermal transfer sheet having the protective layer 54.

For the yellow dye layer 51, the magenta dye layer 52, and the cyan dye layer 53, a material, which is obtained by melting or dispersing a sublimable dye into a binder resin, is preferably used. For the protective layer 54, a resin material, which is transparent and has adhesiveness, light fastness, and the like, is preferably used.

When an image is to be formed on the photographic paper 45, the photographic paper 45 and the yellow dye layer 51 are aligned first. Then, the raising/lowering means 43 lowers the thermal head 40 toward the platen roller 46 so that the photographic paper 45 and the thermal transfer sheet 44 are sandwiched between the thermal head 40 and the platen roller 46.

Then, the photographic paper 45 and the thermal transfer sheet 44 are transported backward (upstream of the thermal head 40). During this transportation, the thermal head 40 heats the yellow dye layer 51 selectively and sequentially on the basis of the gift box template image data, and the yellow dye migrates from the thermal transfer sheet 44 onto the photographic paper 45.

The raising/lowering means 43 raises the thermal head 40, which is separated from the platen roller 46. Then, the photographic paper 45 and the magenta dye layer 52 are aligned. Like the method of causing a yellow dye to migrate, a magenta dye and a cyan dye are caused to migrate onto the photographic paper 45 sequentially. Then, a gift box template image is formed on the photographic paper 45.

Then, the thermal head 40 heats the protective layer 54 on the thermal transfer sheet 44 so that the protective layer 54 is transferred onto the photographic paper 45 to cover the gift box template image. Thus, the printed matter P1 or the printed matter P2 (see FIG. 8 or 9) is produced.

High transfer energy in transfer of the protective layer produces a matte texture in which the protective layer surface has low glossiness. Low transfer energy produces a glossy texture in which the protective layer surface has high glossiness.

For example, when the surface of the protective layer after transfer is to have a matte texture, the energy, which is applied to the thermal head 40, is set high through adjustment so that the glossiness of the protective layer surface after transfer is equal to or less than 40%. In contrast, when the surface of the protective layer after transfer is to have a glossy texture (bright state), the energy, which is applied to the thermal head 40, is set low through adjustment so that the glossiness of the protective layer surface after transfer is equal to or greater than 70%.

Figure 14:
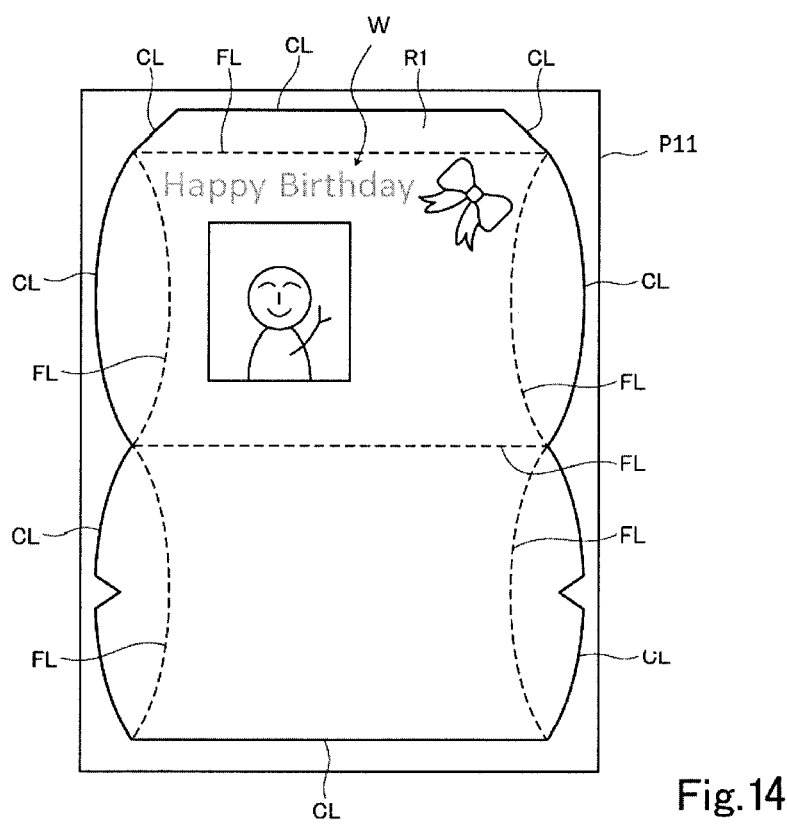
FIG. 14 is a diagram illustrating exemplary printed matter.

In transfer of the protective layer onto a gift box template image, the transfer energy is changed depending on areas. Thus, part may have a matte texture, and the other part may have a glossy texture. For example, as illustrated in FIG. 14, the part having a matte texture corresponds to a pattern of characters and the like. Thus, a watermark pattern W may be formed on printed matter P11. This allows production of a gift box having high-quality design in which the watermark pattern W is viewable by changing the angle of light.

The image print device may store, in the disc device 15 (storage unit), data obtained by associating the usage of gift boxes with watermark patterns, and may receive selection of usage of a gift box from a user in production of the gift box. For example, when the usage is for birthday, the watermark pattern is "Happy Birthday"; when the usage is for Valentine's Day, the watermark pattern is "Happy Valentine".

The printer 13 is notified of watermark pattern data corresponding to the usage selected by a user. In transfer of the protective layer 54 onto the photographic paper 45, the printer 13 sets the transfer energy high for the watermark pattern part so that the surface of the protective layer after transfer has a matte texture. The printer 13 sets the transfer energy low for the other part so that the surface of the protective layer after transfer has a glossy texture.

In the edit screen illustrated in FIG. 7, a watermark pattern may be inserted to a gift box template image. The edit processing unit 145 notifies the printer 13 of the inserted watermark pattern data. In transfer of the protective layer 54 onto the photographic paper 45, the printer 13 sets the transfer energy high for the watermark pattern part. The printer 13 sets the transfer energy low for the other part.

In the embodiment described above, the example in which the folding lines FL (see FIGS. 8 and 9) are printed by using dotted lines or dashed lines is described. Alternatively, the folding lines may be formed by using a watermark pattern. That is, in transfer of the protective layer 54 onto the photographic paper 45, the transfer energy is set high for the folding line part so that the surface of the protective layer after transfer has a matte texture. The transfer energy is set low for the part around the folding lines so that the surface of the protective layer after transfer has a glossy texture.

When a user assembles a gift box, the user folds the printed matter along the folding lines of watermark pattern. For example, when the folding lines are printed by using black dashed lines or the like, if the printed matter is folded at positions shifted slightly from the folding lines, the folding lines may be conspicuous on the assembled gift box. This may degrade the high-quality design of the gift box. In contrast, when the folding lines are formed by using a watermark pattern, even if the printed matter is folded at positions shifted slightly from the folding lines, the folding lines are inconspicuous on the assembled gift box, achieving a gift box having a high-quality design.

Part for a pattern of characters and the like may have a glossy texture, and the other part may have a matte texture.

Although the present invention has been described in detail by way of the specific modes, it is apparent for those skilled in the art that various changes can be made without departing from the spirit and scope of the present invention.

The present application is based on Japanese Patent Application No. 2019-160491 filed on Sep. 3, 2019, and Japanese Patent Application No. 2020-130612 filed on Jul. 31, 2020, the entire contents of which are incorporated herein by reference.

REFERENCE SIGNS LIST 1 housing
2 openable door
10A first touch panel
10B second touch panel
11 data input unit
12 billing unit
13 printer
14 CPU
15 disc device
16 main memory
141 box selection unit
142 sheet-type selection unit
143 design selection unit
144 image selection unit
145 edit processing unit
146 printing processing unit

The invention claimed is:

1. An image print device comprising:
an input unit to which a user image is input;
a storage unit storing a plurality of template images of gift boxes different in shape or size, and storing a table in which an item to be stored in a gift box is associated with a gift box having a shape or size suitable for storage of the item;
a selection unit receiving selection of an item to be stored in a gift box, and referring to the table to select a gift box having a shape or size corresponding to the item that is selected;
an edit processing unit combining the user image with a template image corresponding to the gift box selected by the selection unit, and generating a combined image; and
a printer printing, for output, the combined image on a sheet,
wherein the printer
heats a color material layer to form the combined image on the sheet, the color material layer being disposed on a thermal transfer sheet, and transfers a protective layer onto the combined image formed on the sheet, the protective layer being disposed on the thermal transfer sheet, and
transfers the protective layer onto the combined image in such a manner that a surface state of the protective layer is different between a part corresponding to a predetermined pattern and an other part,
wherein the printer transfers the protective layer in such a manner that the part corresponding to the predetermined pattern has a matte texture and the other part has a glossy texture whose glossiness is higher than glossiness of the matte texture, and
wherein the predetermined pattern indicates a folding line for assembling a gift box.

2. An image print device comprising:
an image input unit to which a user image is input;
an identification information input unit receiving input of identification information for identifying a shape or size given to a sample of a gift box;
a storage unit storing a plurality of template images of gift boxes different in shape or size;
a selection unit selecting a gift box on a basis of the identification information that is input;
an edit processing unit combining the user image with a template image corresponding to the gift box selected by the selection unit, and generating a combined image; and
a printer printing, for output, the combined image on a sheet,
wherein the printer
heats a color material layer to form the combined image on the sheet, the color material layer being disposed on a thermal transfer sheet, and transfers a protective layer onto the combined image formed on the sheet, the protective layer being disposed on the thermal transfer sheet, and
transfers the protective layer onto the combined image in such a manner that a surface state of the protective layer is different between a part corresponding to a predetermined pattern and an other part,
wherein the printer transfers the protective layer in such a manner that the part corresponding to the predetermined pattern has a matte texture and the other part has a glossy texture whose glossiness is higher than glossiness of the matte texture, and
wherein the predetermined pattern indicates a folding line for assembling a gift box.

3. An image print method by use of an image print device including a memory that stores a plurality of template images of gift boxes different in shape or size, and stores a table in which an item to be stored in a gift box is associated with a gift box having a shape or size suitable for storage of the item, the image print method comprising:

receiving input of a user image;

receiving selection of an item to be stored in a gift box, and selecting a gift box having a shape or size corresponding to the item that is selected by referring to the table;

combining the user image with a template image corresponding to the selected gift box, and generating a combined image; and printing the combined image on a sheet, wherein the image print device heats a color material layer to form the combined image on the sheet, the color material layer being disposed on a thermal transfer sheet, and transfers a protective layer onto the combined image formed on the sheet, the protective layer being disposed on the thermal transfer sheet, and transfers the protective layer onto the combined image in such a manner that a surface state of the protective layer is different between a part corresponding to a predetermined pattern and an other part, wherein the image print device transfers the protective layer in such a manner that the part corresponding to the predetermined pattern has a matte texture and the other part has a glossy texture whose glossiness is higher than glossiness of the matte texture, and wherein the predetermined pattern indicates a folding line for assembling a gift box.

4. An image print method by use of an image print device including a memory that stores a plurality of template images of gift boxes different in shape or size, the image print method comprising:

receiving input of a user image;

receiving input of identification information for identifying a shape or size given to a sample of a gift box;

selecting a gift box on a basis of the identification information that is input;

combining the user image with a template image corresponding to the selected gift box, and generating a combined image; and printing the combined image on a sheet, wherein the image print device heats a color material layer to form the combined image on the sheet, the color material layer being disposed on a thermal transfer sheet, and transfers a protective layer onto the combined image formed on the sheet, the protective layer being disposed on the thermal transfer sheet, and transfers the protective layer onto the combined image in such a manner that a surface state of the protective layer is different between a part corresponding to a predetermined pattern and an other part, wherein the image print device transfers the protective layer in such a manner that the part corresponding to the predetermined pattern has a matte texture and the other part has a glossy texture whose glossiness is higher than glossiness of the matte texture, and wherein the predetermined pattern indicates a folding line for assembling a gift box.

\* \* \* \* \*